UNITED STATES PATENT OFFICE.

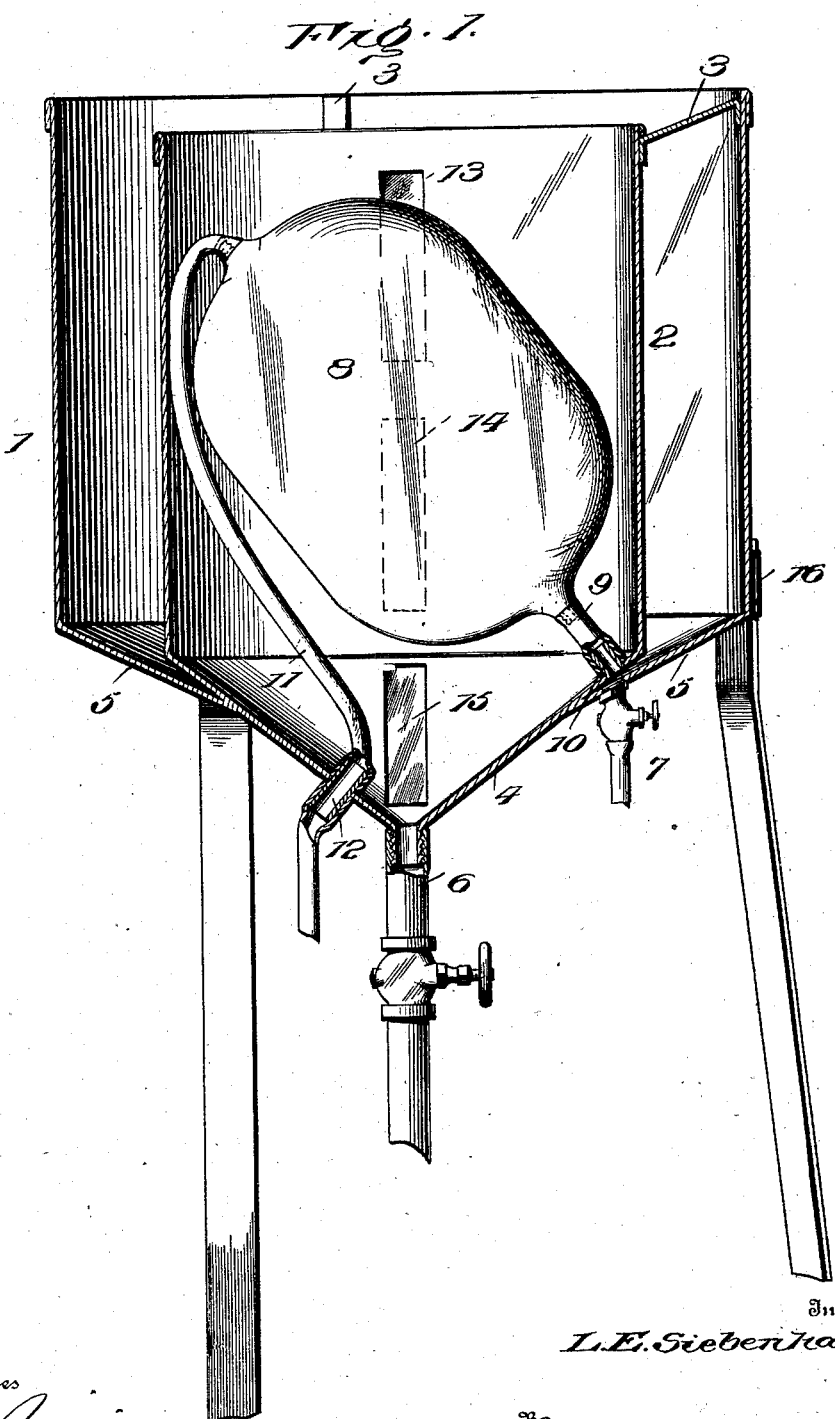

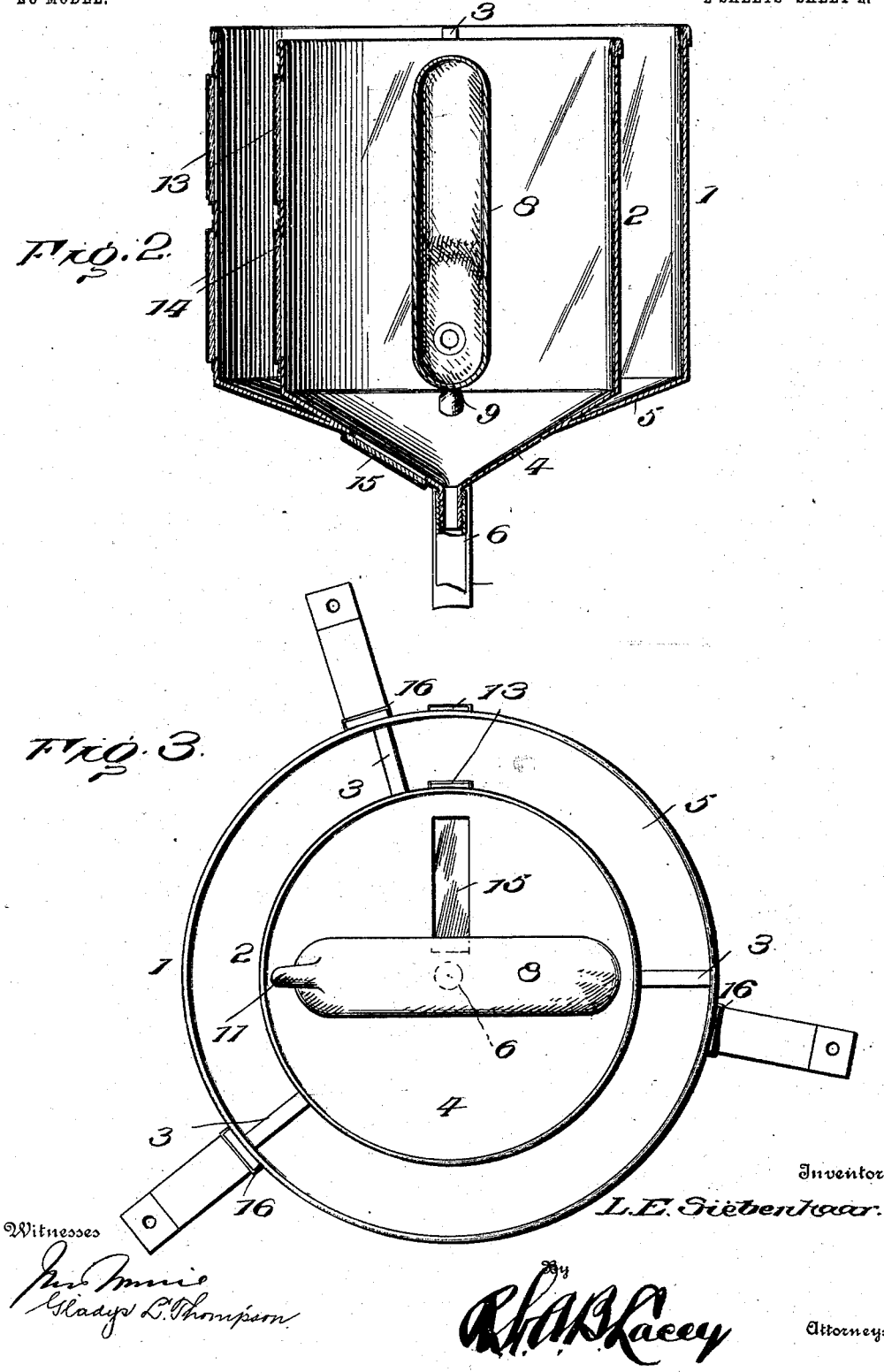

LOUIS E. SIEBENHAAR, OF ROSENDALE, WISCONSIN.

CREAM-SEPARATOR.

SPECIFICATION forming part of Letters Patent No. 717,936, dated January 6, 1903.

Application filed May 7, 1902. Serial No. 106,335. (No model.)

*To all whom it may concern:*

Be it known that I, LOUIS E. SIEBENHAAR, a citizen of the United States, residing at Rosendale, in the county of Fond du Lac and State of Wisconsin, have invented certain new and useful Improvements in Cream-Separators; and I do hereby declare the following to be a full, clear, and exact description of the invention, such as will enable others skilled in the art to which it appertains to make and use the same.

This invention relates to cream-separators, the object in view being to provide a simple, convenient, and effective receptacle by means of which milk may be cooled and the cream caused to rise and separate therefrom, after which the milk and cream may be separately drawn off from the receptacle.

One of the principal objects of the invention is to provide means for affording a thorough circulation of cold water around the milk and also through the body of the milk, thus causing a rapid separation of the cream.

With the above and other objects in view, the nature of which will more fully appear as the description proceeds, the invention consists in the novel construction, combination, and arrangement of parts, as hereinafter fully described, illustrated, and claimed.

In the accompanying drawings, Figure 1 is a vertical cross-section through a cream-separator constructed in accordance with the present invention, taken in line with the nozzles of the flexible bag. Fig. 2 is a similar view taken at an angle to Fig. 1 and in line with the glass gages or observation-openings. Fig. 3 is a plan view of the cream-separator.

Similar reference-numerals designate corresponding parts in all figures of the drawings.

The cream-separator contemplated in this invention comprises, essentially, an outer receptacle 1 for water and an inner receptacle 2 for milk, the inner receptacle being sufficiently smaller than the outer receptacle to provide an intervening annular water-space entirely surrounding the milk-receptacle and adapted to hold the same amount of water as the inner receptacle will hold milk. Both the outer and inner receptacles are by preference cylindrical for the sake of economy in manufacture and convenience of use; but the shape of the outer and inner receptacles may be varied at will without sacrificing any of the advantages of this invention.

The receptacles 1 and 2 are connected and mutually braced at or near their upper edges by means of radiating bars or braces 3, while the bottoms are made conical in shape, the conical bottom 4 of the inner milk-receptacle being pitched more steeply than the conical bottom 5 of the outer receptacle, the bottom 5 joining or merging into the bottom 4 at a point between the outer edge of the bottom 4 and the outlet at the vertex or bottom of the conical bottom of the inner receptacle. Thus cold water is allowed to circulate not only around the inner receptacle, but also partially beneath the same. At the lowest point of the conical bottom of the inner receptacle there is located a draw-off spout 6, which may be controlled by a suitable stop-cock or valve, for drawing off the milk and cream at the proper time. The outer receptacle is provided in its bottom with another spout 7, controlled by a suitable stop-cock or valve, for rapidly drawing off the water after the milk and cream have been drawn off in the manner described, thus providing for a thorough flushing and cleansing of the separator as a whole.

Within the inner milk-receptacle is arranged a flexible and collapsible bag or sack 8, constructed of some such material as rubber, so as to render the same liquid-proof. At one end of said bag a flexible tube 9 communicates therewith and leads to a nozzle 10, which opens through the conical bottom of the milk-receptacle into the bottom portion of the water-receptacle, so as to allow cold water to flow into the bag. At the opposite side or end of the bag is arranged another flexible tube 11, which communicates with the bag and also with a nozzle 12, which passes through the bottom of the milk-receptacle and outward beneath the same to discharge water which has passed through the bag and absorbed the heat from the milk. The milk is placed in the inner receptacle surrounding the flexible bag, and water is then placed in the outer receptacle, so as to flow around the milk-receptacle and beneath the same. The water then passes from the outer receptacle into the flexible bag and expands and fills the bag, finally flowing outward from a point near the top thereof and finding its way through the discharge-spout 12 at the bottom of the apparatus. Fresh cold water is thus constantly supplied to the flexible bag, and thus absorbs the heat from the body of the milk and passes onward, keeping up a constant flow of water directly through the body of the milk. This cooling effect, taken in connection with the cooling effect of the body of water surrounding the milk-receptacle, causes a rapid absorption of the heat from the milk and the separation of the cream from the milk.

The outer and inner receptacles 1 and 2 are provided with glass gages or observation-openings covered by a transparent material, as shown at 13 and 14, said openings being in alinement with each other, so that the condition of the milk and cream may be examined from the side by looking directly through said openings. An additional observation-opening or gage 15 is arranged in the conical bottom of the milk-receptacle to guide the operator in drawing off and separating the milk and cream. After the milk and cream have been separated by the action of the cold water the central discharge-spout is opened until the milk has been discharged into a receptacle placed beneath. By looking through the gage 15 it may be readily seen when the separating-line between the milk and cream is reached, at which time the flow is cut off until another receptacle may be placed beneath the cream-separator to receive the cream. In this way the milk and cream are separated independently and drawn off.

Upon the outside of the water-receptacle are arranged sockets 16 for the reception of detachable supporting legs or standards. (Not shown.)

I do not desire to be limited to the details of construction and arrangement hereinabove set forth, and accordingly reserve the right to make such changes as properly fall within the scope of the appended claim.

Having thus described the invention, what I claim as new is—

In a cream-separator, in combination, an outer water-receptacle and an inner milk-receptacle, a cooling-receptacle of flexible material located within the said inner milk-receptacle and having flexible connection with the water-receptacle, a flexible tube having connection with the upper portion of the flexible receptacle and with an outlet-opening at the lower portion of the milk-receptacle, substantially as set forth.

In testimony whereof I affix my signature in presence of two witnesses.

LOUIS E. SIEBENHAAR. [L. S.]

Witnesses:
C. E. McCUMBER,
FRANK BOWE.